Jan. 24, 1967 G. W. COPE Re. 26,143

DRAFT RIGGING

Original Filed Aug. 16, 1963 5 Sheets-Sheet 1

Inventor:
Geoffrey W. Cope
By Wilmer Mechlin
his Attorney

DRAFT RIGGING

Original Filed Aug. 16, 1963 5 Sheets-Sheet 2

Inventor:
Geoffrey W. Cope
By Wilmer Mechlin
his Attorney

Jan. 24, 1967

G. W. COPE

DRAFT RIGGING

Re. 26,143

Original Filed Aug. 16, 1963

5 Sheets-Sheet 3

Inventor:
Geoffrey W. Cope
By Wilmer Mechlin
his Attorney

Jan. 24, 1967

G. W. COPE

DRAFT RIGGING

Re. 26,143

Original Filed Aug. 16, 1963

5 Sheets-Sheet 4

Inventor:
Geoffrey W. Cope

By Wilmer Meehlin
his Attorney

Jan. 24, 1967
G. W. COPE
DRAFT RIGGING
Re. 26,143
Original Filed Aug. 16, 1963
5 Sheets-Sheet 5
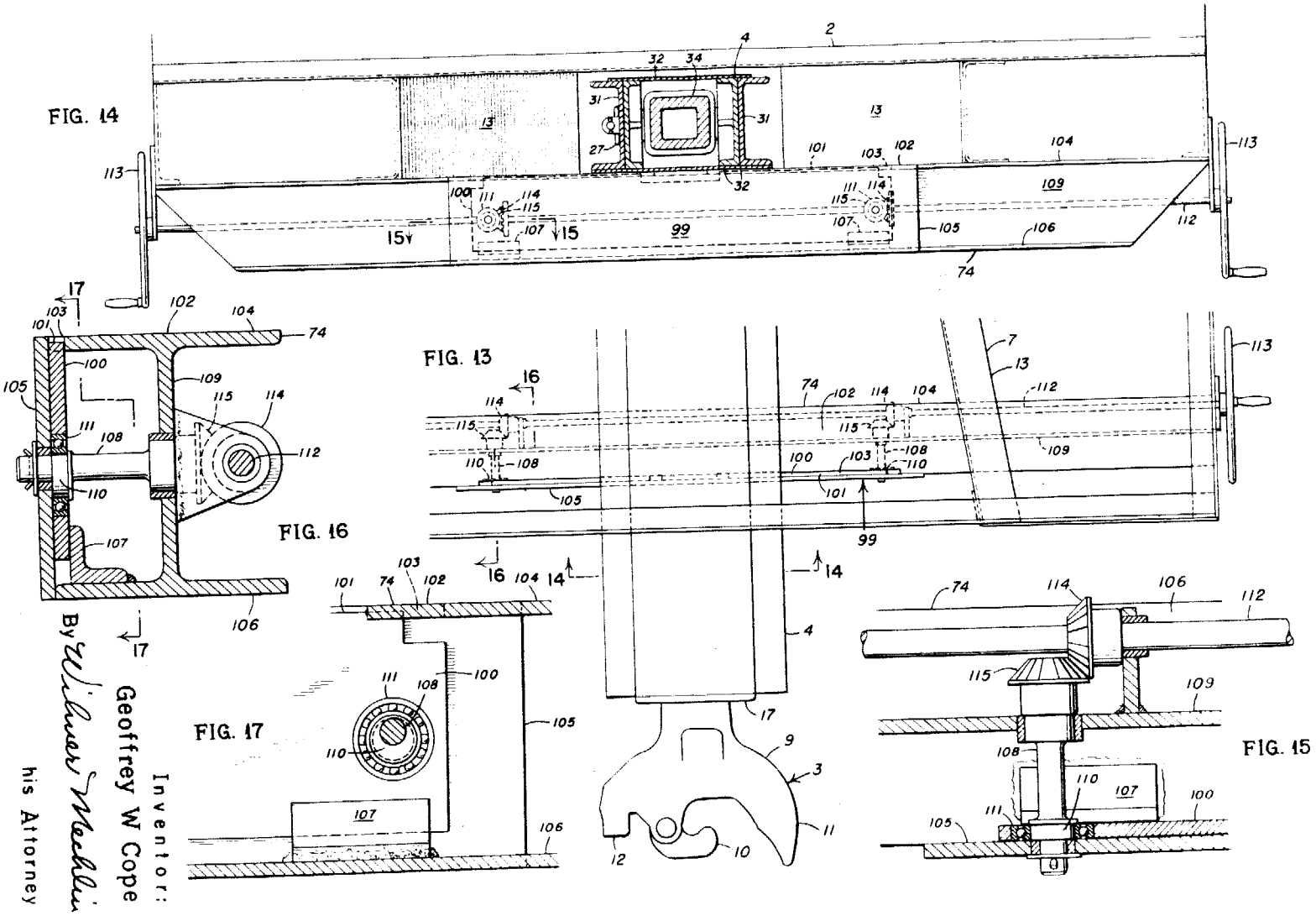
Inventor:
Geoffrey W Cope
By Wilmer Mechlin
his Attorney United States Patent Office Re. 26,143
Reissued Jan. 24, 1967

26,143
DRAFT RIGGING

Geoffrey W. Cope, Williamsville, N.Y., assignor to Symington Wayne Corporation, Salisbury, Md., a corporation of Maryland Original No. 3,211,297, dated Oct. 12, 1965, Ser. No. 302,668, Aug. 16, 1963. Application for reissue Mar. 2, 1966, Ser. No. 536,535
22 Claims. (Cl. 213—72)

Matter enclosed in heavy brackets [ ] appears in the original patent but forms no part of this reissue specification; matter printed in italics indicates the additions made by reissue.

This invention relates to railway draft rigging and has for its primary object the provision of an improved draft rigging particularly suited for use on long freight cars.

The mushrooming demands of shippers in recent years for longer, higher capacity freight cars, of which the most notable examples are "piggyback" cars, have presented ever-increasing problems in car design which in the case of length have now reached the critical stage. A length of 85 feet, unheard of a few years ago, is now quite common in piggyback cars and even longer cars are proposed and in some cases now in service.

The design problems material to this invention in the increased length of present and proposed long cars arise because of curves in present trackage, most of which were laid out to handle much shorter cars. Even for a car of usual width to negotiate the lesser radius curves by itself, without overly offsetting its centerline relative to that of the track, imposes a limit of somewhere around 70 feet on the spacing between the centers of the car's trucks, which in turn makes it necessary to provide any length above that spacing as overhang at the ends of the car beyond the trucks. It is the latter that is responsible for the reaching of a critical stage in attempting to increase the length of the cars with draft rigging now available.

Of the present standard freight car couplers, the Type E permits considerable angling or play in the coupling due to its contour, has a very small gathering range and in its standard version is adapted only for horizontal angling. The other, the Type F or so-called interlocking coupler, has a centrally spherical butt for enabling it to angle universally and, by virture of the interlock, provides much less contour angling in the coupling and has a considerably greater gathering range than the Type E. The longer versions of both couplers now in service have a length between pivot and pullingface of 43 inches and it is calculated that this can be increased to a maximum of about 60 inches before the column strength of the shank becomes inadequate.

When applied to a long car with long overhangs, E couplers, by adding to the maximum lateral offset obtainable with either type the greater contour angling they provide in the coupling, while not permitting the negotiation of minimum radius curves, will enable the car to be pulled around a sharper curve than if equipped with F couplers, and its curve negotiability in draft can be further improved by increasing the length of its couplers to the 60-inch maximum. However, E couplers of maximum length coupling long cars, will jackknife in buff and thus are not usable. Jackknifing in buff can be eliminated by equipping the long cars with F couplers, but even if the couplers are of maximum length, the interlock in the coupling responsible for preventing jackknifing also drastically reduces the curve-negotiability of the cars and does not provide the freedom required for the vertical curves commonly used for humping in classification yards.

Another and extremely serious problem posed by conventional draft rigging on the length of cars is that, under severe but not untypical conditions, a long car so equipped can be derailed. The lateral force or component of the pulling or coupler force upon a long car is high whenever the car is pulled around a curve that, while sharp, is within its range of curve negotiability. If at that time the car is coupled at the front to a short car, such as a conventional hopper or box, and at the rear to another long car and particularly if it is positioned near the head of a long train, the pulling force, applied necessarily at coupling height through the front coupler with the latter at substantially maximum lateral displacement or angling, will have a lateral component which in turn will produce an inwardly directed resultant force through the inner wheel flanges on the inner rail sufficient to derail the car by overturning that rail. The condition is aggravated if the car is light and can be improved either by placing the car further back toward the rear end of the train or by increasing the length of the couplers. However, although increase in the coupler length up to the permissive maximum of 60 inches may help somewhat, possibly in reducing the lateral angling and at least in decreasing the moment arm of the lateral component of the pulling force, it alone will not suffice to prevent the derailment.

Although not themselves limiting the permissive length of a long car, other serious problems incident to its increased length are in the centering of the couplers of a long car for connection to another car and the mounting of the angle cocks. Sometimes on straight track and especially on a curve, even the gathering range of an F coupler will be insufficient to ensure coupling and the couplers must often be centered manually, an expedient almost as dangerous as the manual coupling and uncoupling outlawed over eighty years ago when automatic couplers were made mandatory. Lastly, to operate satisfactorily on present long cars equipped with either conventional long couplers or couplers of the maximum permissive length, the angle cocks must be mounted on the couplers where they are very vulnerable to damage by passing couplers in attempting automatic coupling without prior manual centering or at least assurance that the couplers to be coupled are sufficiently aligned to be within their gathering ranges.

An object of the present invention is to provide an improved draft rigging for enabling a long car to negotiate minimum radius horizontal and vertical curves and eliminating the risks of jackknifing in buff and derailment in draft and buff.

Another object of the invention is to provide a draft rigging whereby the point about which a coupler angles laterally is made independent of the length of the coupler and can be moved inwardly toward the center of the car sufficiently to provide adequate lateral displacement to meet all service conditions and at the same time reduce the lateral force on the car under the severest conditions below the level at which it can cause a derailment.

An additional object of the invention is to provide a draft rigging which not only has the foregoing capabilities but can be applied to either floating or fixed sills.

A further object of the invention is to provide a draft rigging wherein a coupler is mounted for vertical swinging in a draft arm which in turn is connected for horizontal swinging to floating or fixed sills thereby not only enabling the point at which a pulling force is applied to a car to move inwardly sufficiently to eliminate any possibility of derailment by the lateral component of that force but permitting the coupler to have an interlocking head so as to prevent jackknifing in buff without detriment to the ability of the car to negotiate minimal horizontal and vertical curves.

Another object of the invention is to provide a draft rigging for long cars which not only eliminates the various problems heretofore confronted in designing such cars but permits use of a coupler which, while having an interlocking head, has a simpler butt and is supported on a simpler carrier than is possible with a conventional Type F coupler.

Another object of the invention is to provide a draft rigging for long cars which, in addition to eliminating the limitations imposed on such cars by conventional draft rigging, permits the angle cocks to be mounted out of harm's way on a horizontally swingable member to which the coupler is connected instead of on the coupler itself.

A further object of the invention is to provide a draft rigging for long cars wherein a coupler having an interlocking head is adapted for horizontal and vertical angling, as well as to accommodate any necessary twisting or rotation, and the responsibility for horizontal angling is borne by a connection between a sill or sills and a member to which the coupler is connected for vertical angling, with the twisting accommodated in one of the member's connections.

An additional object of the invention is to provide a draft rigging for long cars which, whether a car has floating or fixed sills, enables a coupler to be centered for coupling on either straight or curved track and eliminates the need for manual centering by direct handling.

Another object of the invention is to provide a draft rigging for long cars wherein the coupler, when uncoupled, is automatically centered on the track in position to couple with another coupler, whether the car is on straight or curved track.

Another object of the invention is to provide a draft rigging for long cars in which the coupler is automatically centered for coupling and which, by deriving its centering action from the adjoining truck, centers the coupler on the track rather than on the car, thereby ensuring that the coupler will be aligned for coupling regardless of the offset of the centerline of the car relative to the track.

An additional object of the invention is to provide a draft rigging for long cars wherein a coupler, while manually centered for coupling, is so centered by mechanism operable from a side of a car without danger to the operator.

Other objects and advantages of the invention will appear hereinafter in the detailed description, be particularly pointed out in the appended claims and be illustrated in the accompanying drawings in which:

FIGURE 13 is a fragmentary plan view of the draft rigging of the present invention with the automatic centering device of the preceding figures replaced by a manually actuated centering device;

FIGURE 14 is a vertical sectional view taken along lines 14—14 of FIGURE 13;

FIGURE 15 is a fragmentary horizontal sectional view on an enlarged scale, taken along lines 15—15 of FIGURE 14;

FIGURE 16 is a fragmentary vertical sectional view on the scale of FIGURE 15, taken along lines 16—16 of FIGURE 13; and FIGURE 17 is a vertical sectional view taken along lines 17—17 of FIGURE 16.

Figure 1:
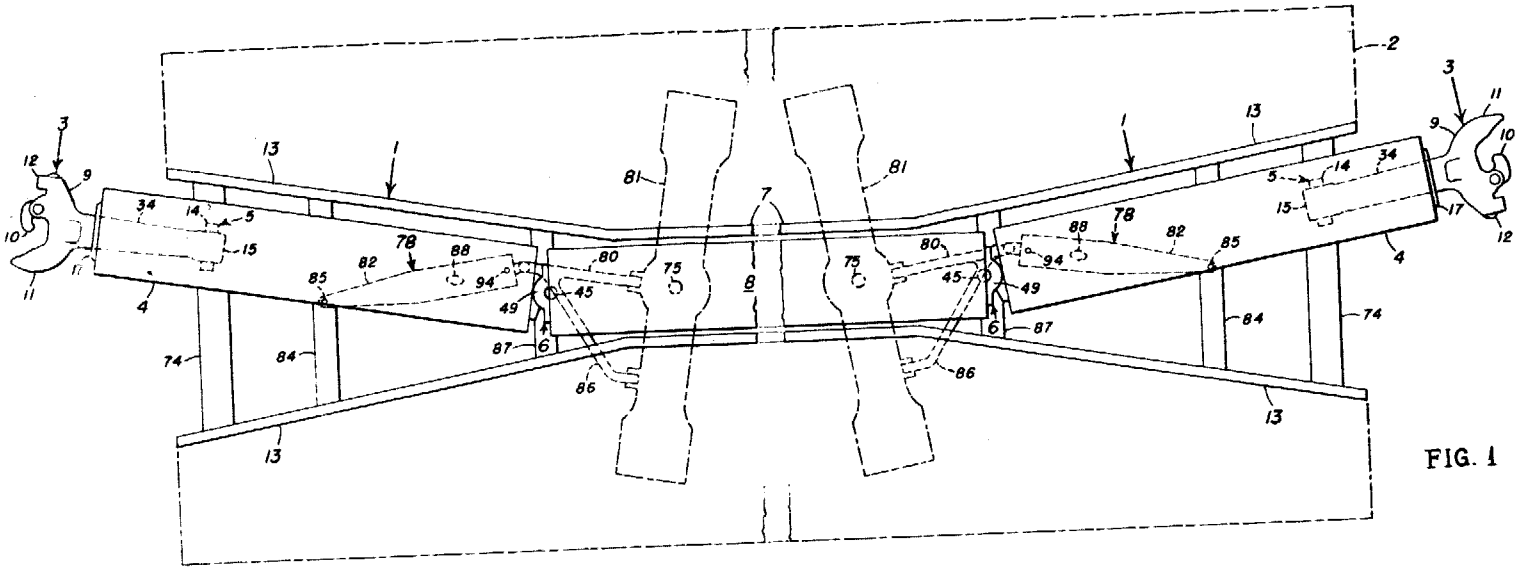
FIGURE 1 is a somewhat diagrammatic plan view of a preferred embodiment of the draft rigging of the present invention showing the relation between certain of the parts in negotiating a curve.
Figure 8:
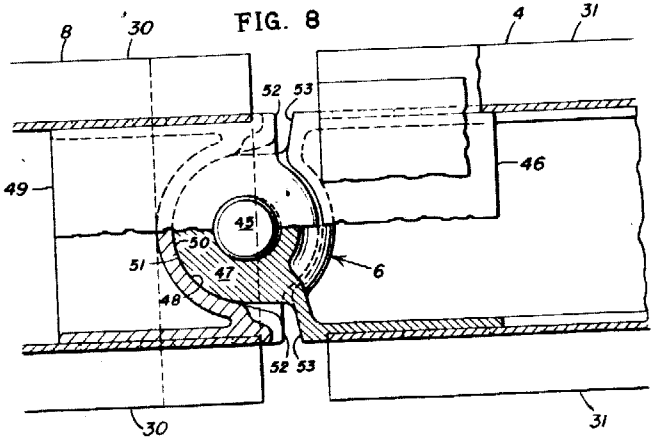
FIGURE 8 is a fragmentary horizontal sectional view on the scale of FIGURE 7, taken along lines 8—8 of FIGURE 3.
Figure 7:
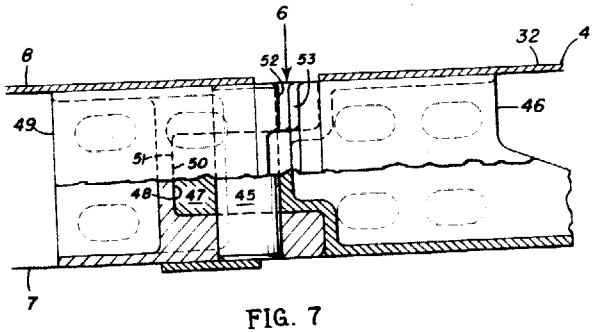
FIGURE 7 is a fragmentary vertical sectional view on the scale of FIGURE 4, taken along lines 7—7 of FIGURE 2.
Figure 2:
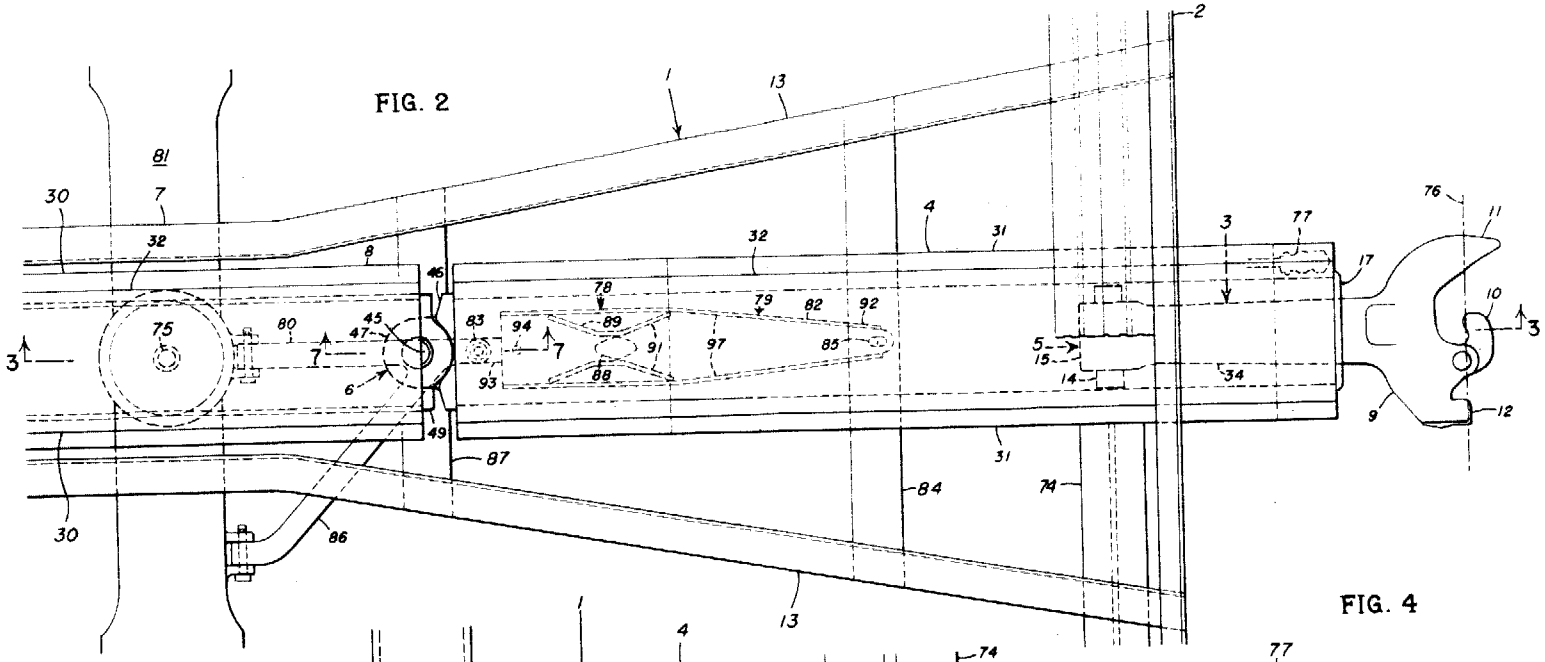
FIGURE 2 is a fragmentary plan view on an enlarged scale of the structure of FIGURE 1, with certain portions removed and others broken away to more clearly illustrate certain of the details of construction.
Figure 4:
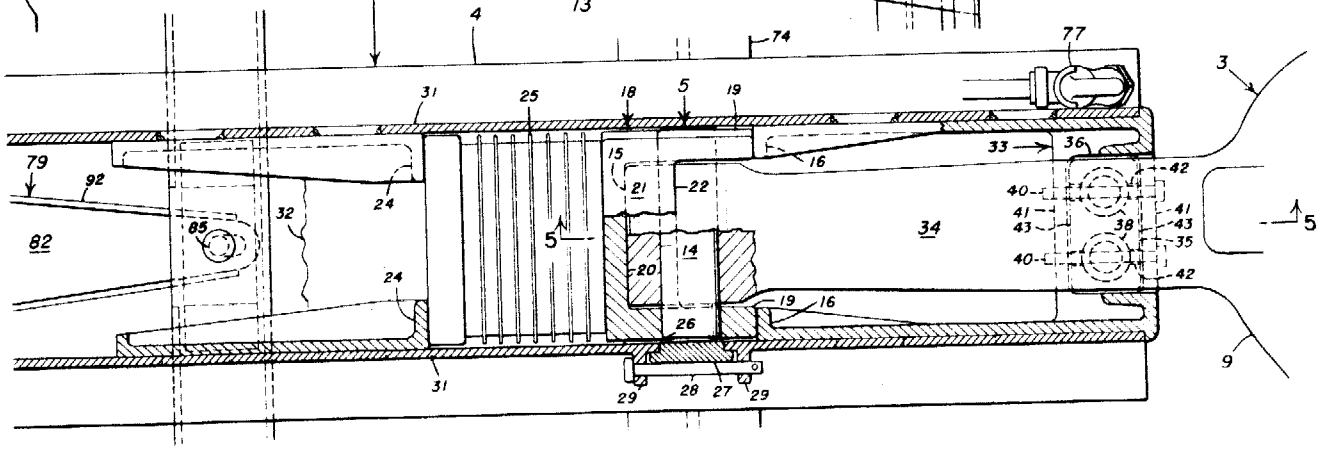
FIGURE 4 is a fragmentary horizontal sectional view on an enlarged scale, taken along lines 4—4 of FIGURE 3, with portions broken away and shown in section.
Figure 3:
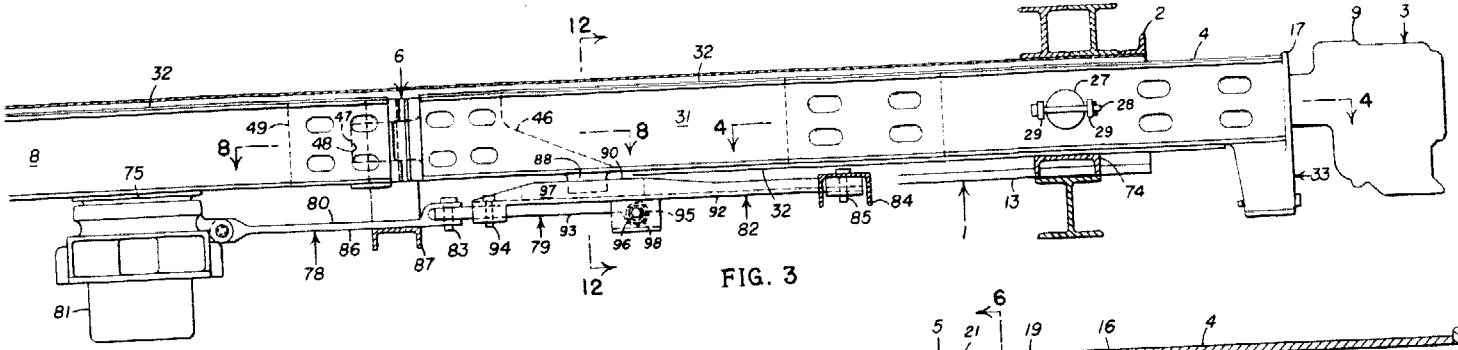
FIGURE 3 is a side elevational view of the structure of FIGURE 2, with portions broken away and shown in section.
Figure 5:
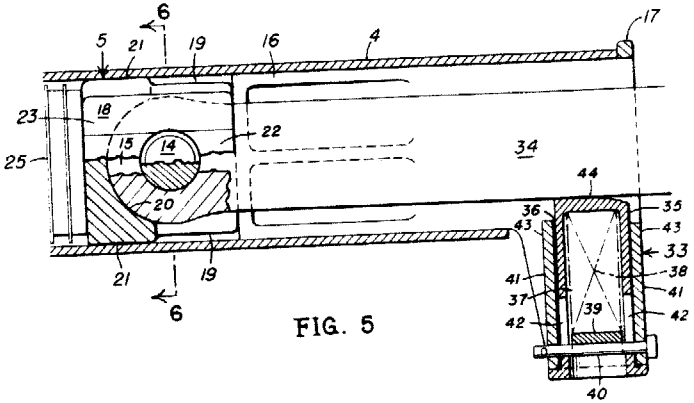
FIGURE 5 is a fragmentary vertical sectional view taken along lines 5—5 of FIGURE 4.
Figure 11:
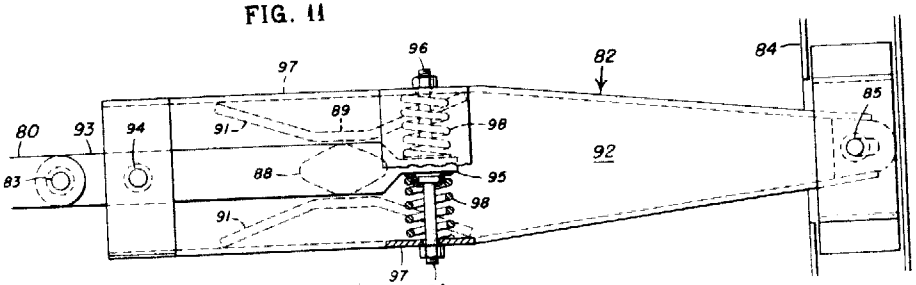
FIGURE 11 is a fragmentary bottom plan view, partly in section and on an enlarged scale showing [of] part of the automatic centering device.
Figure 6:
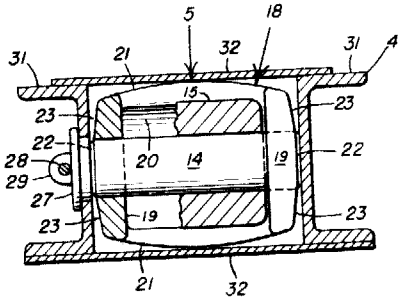
FIGURE 6 is a vertical sectional view taken along lines 6—6 of FIGURE 5.
Figure 12:
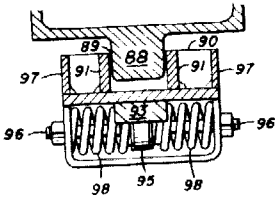
FIGURE 12 is a fragmentary vertical sectional view on the scale of FIGURE 11, taken along lines 12—12 of FIGURE 3.

Referring now in detail to the drawings in which like reference characters designate like parts, the improved draft rigging of the present invention is particularly designed for use on long freight cars for enabling such cars to be made longer than is permitted by conventional draft rigging, as well as to make it feasible to increase the overhangs and reduce the spacing between truck centers of long cars of lengths now in service, such as the recently introduced 85-foot piggyback cars. Whether within or beyond present lengths, a long car equipped with the improved draft rigging has much better negotiability of both horizontal and vertical curves than present long cars and at the same time is not derailable under even the severest conditions by the lateral component of the pulling force to which it is subjected on being pushed or pulled around a curve. The draft rigging is adaptable for use on cars which depend for cushioning on draft gears fitted into fixed or stationary pockets in the car's fixed center sills. However, it is equally applicable to cars depending for cushioning on long travel, draft or floating sills of so-called cushioned underframes and since most long cars now being made are equipped with cushioned underframes for the better cushioning that they afford, it is to such an underframe that the improved draft rigging has been applied in illustrating the invention.

Regardless of its application, the improved draft rigging, designated generally as 1, is comprised, at each end of a long freight or other railway car 2 to which it is applied, of a coupler 3 and draft arm or shaft 4 or 4a *having* a connection 5 for at least relative vertical swinging, pivoting or swivelling, with the draft arm also having a connection 6, rearwardly or inwardly of the [couupler] *coupler*, for at least relative horizontal swinging, pivoting or swivelling, to a car's fixed center sills 7 either directly or through a floating or draft sill 8 movable longitudinally against yieldable resistance in the center sills. The term "at least," with reference to the relative movements of the coupler 3, draft arm 4 or 4a and floating sill 8 or fixed sills 7, has particular bearing, if, as is preferred to eliminate the possibility of jackknifing in buff, the head 9 of the coupler is of a type that, when coupled, is severely limited in its movement relative to the other coupler by an interfit or engagement therewith at both sides of its knuckle or other coupling element 10. Such heads, sometimes hereinafter referred to as interlocking or F heads, are typified by the heads of conventional Type F couplers which, when coupled by their knuckles 10, have a guard arm 11 of each received in a pocket (not shown) in a wing 12 of the other. Interlocking heads thus are so limited in their relative movement as to be incapable of accommodating between them the rotational or torsional movement of as much as about 4½° between connected cars required under certain service conditions, as when rounding a curve on a grade. It, therefore, is necessary to provide for such limited rotative movement in one or the other of the vertical and horizontal pivotal connections 5 and 6, respectively, in the draft rigging.

The draft arm 4 or 4a is aligned horizontally with or at the level of the floating or fixed sills 8 or 7 and the objective of reliance upon the pivotal connection 6 between the draft arm and the floating or fixed sills for the horizontal swinging of the coupler 3 is to enable the horizontal pivot of the coupler to be moved, shifted or positioned inwardly or rearwardly toward the center of the car without change in the level of the pivot and without regard to or corresponding increase in the length of the coupler and, by the increased spacing or length so provided between the head 9 of the coupler and the horizontal pivot, to increase the lateral or horizontal displacement or swing of the coupler, while minimizing the lateral or horizontal angularity of the coupler relative to the common centerline of the car 2 and its fixed center sills 7. Since such horizontal or lateral displacement could not be obtained within the lateral spacing between the center sills of a conventional underframe, it is contemplated in the draft rigging of this invention to increase the spacing between the center sills 7 sufficiently to accommodate the increased lateral displacement either by applying such increased spacing to the sills throughout their length or, as illustrated, by providing the sills with end portions 13 which flare or diverge outwardly or forwardly toward the ends of the car.

In illustrating the application of the improved draft rigging to a cushioned underframe, two embodiments have been shown. The same in their basic essentials, the embodiment differ in several respects but are purposed mainly to show how the limited rotational or torsional movement required between the coupler at each end of the car and the fixed sills in using the preferred interlocking head 9, can be provided for in each of the pivotal connections 5 and 6. Thus, the rotational movement is accommodated in the main or first embodiment of FIGURES 1–8 in the vertical pivotal connection 5 between the coupler 3 and the draft arm 4 and in the second embodiment of FIGURES 9 and 10 in the horizontal pivotal connection 6 between the draft arm 4a and the floating sill 8.

Considering the embodiments in order, in the first embodiment of FIGURES 1–8, the illustrated coupler 3 has an interlocking head 9 of the type used on the standard F coupler and is of the length of such a coupler but differs therefrom in having a horizontal pivot or coupler pin 14, which, or more precisely the center or axis of which is the coupler's vertical pivot, and a horizontally disposed, convexly cylindrical butt 15 concentric with the pin. Were not the vertical pivotal connection 5 required in this embodiment to accommodate some rotational movement, draft forces on the coupler could be transmitted directly from the coupler pin 14 to the draft arm 4, as through front draft lugs 16 fixed to or rigid with the draft arm and either separate from or, as illustrated, integral with a striking casting 17 fixed to and conveniently received in the end of the draft arm. However, to accommodate the rotational movement, the pivot pin 14, instead, pivotally connects the coupler 3 for relative vertical swinging to a front follower or swivel-block or connector 18 having arms 19 laterally embracing the butt 15 through which the pivot pin 14 extends and, between the arms, a concavely cylindrical bearing surface or socket 20 concentric with and engaged by the butt. The follower 18 is angleable vertically relative to the coupler 3, by virtue of the connecting pivot pin 14, and is so configured at the side as to permit it to rotate or turn with the coupler relative to the draft arm, thus to accommodate the required rotational movement of the coupler relative to the fixed sills 7. Since the required rotation is very limited, the follower 18 need not be cylindrical-sided. Instead, the required limited relative rotational movement can be obtained either by providing sufficient transverse play between the follower and the draft arm or, as illustrated, the follower can present, for rocking engagement with the draft arm, an arcuately convex rocker surface 21 at the top or, for reversibility, at both top and bottom and its width can be made slightly less than the internal width of the draft arm 4 with its sides 22 bevelled, as at 23, toward their vertical extremities to both accommodate and limit the rotational movement derived from the rocking engagement.

In each of the illustrated embodiments, as in a conventional cushioned underframe, the buffing forces on the coupler 3 are designed to be partially cushioned before they are transmitted to the floating sill 8. In this embodiment, the partial cushioning is accomplished by pocketing in the draft arm 4 at the rear of the follower 18 and between the front draft lugs 16 and rear stop lugs 24 fixed to the sill, a rubber or other suitable cushioning mechanism 25. Engaged at the rear by the cushioning mechanism 25 and with its arms 19 engageable at the front with the draft lugs 16, the follower 18 transmits draft forces directly to the draft arm 4 and therethrough to the floating sill 8, but in buff transmits the forces to the draft arm through the interposed cushioning mechanism. Conveniently with the box shape of a conventional floating sill, the draft arm 4 is adapted for insertion of the pivot pin 14 to connect the coupler 3 and the follower 18 by providing in one of its sides a pin-receiving opening 26 normally closed by a plug 27, with the plug removably held in place by suitable means, such as the illustrated retainer bar 28 passing through ears 29 on the draft arm at sides of the opening.

Together forming an articulated or jointed floating or draft sill extending from end to end of the car 2, the draft arms 4 and floating sill proper 8, as illustrated in this embodiment, conveniently are fabricated, the floating sill of channel side members 30 welded together at the top and the arms of channel side members 31 connected at top and bottom by cross or cover plates 32. As applied to a cushion underframe, an articulated draft sill having the above-described construction of the vertical pivotal connection 5 in which the coupler butt 15 is straddled horizontally by the arms 19 of the follower 18, has the advantage over a conventional F coupler connection for enabling the draft arm 4, as well as the floating sill 8, to be reduced in height *to* only [to] about 10 inches, instead of the normal 12⅞ inches, with corresponding permissible lowering of the height and center of gravity of the car.

The elimination of dependence of the coupler 3 upon its connection to the follower 18 for horizontal as well as vertical angling, also permits simplification of the coupler carrier 33 resiliently supporting the shank 34 of the coupler 3 over the conventional F carrier. With no allowance needed for horizontal angling, the coupler carrier 33 may include a carrier iron 35 fitting in a vertically disposed, open-ended pocket 36 in or rigid with the striking casting or striker 17 and having a bottom-opening recess 37 for housing vertically disposed coil or like suitable springs, indicated at 38. The springs 38 react downwardly against a support plate 39 housed in the carrier iron 35 and the plate in turn is supported on a pair of support pins 40 extending longitudinally of the draft arm through the front and rear walls 41 of the pocket 36 and slots 42 in the corresponding walls 43 of the carrier iron. Flanged at the bottom of its front and rear walls 43 for limiting its upward movement, the carrier iron 35 is made movable vertically in the pocket 36 by its pin-and-slot connection thereto and the downward swinging of the coupler 3 which such movement accommodates [and], is further accommodated by the provision on the upper end of the carrier iron of an arcuate, forwardly sloping support surface 44 and corresponding relative stepping of the front and rear walls 41 of the pocket.

With the relative rotative movement between the coupler 3 and the floating sill 8 taken in the connection 5 between the coupler and the draft arm 4, the latter need only be connected for relative horizontal swinging or pivoting to the floating sill and a horizontal pivotal connection 6 suitable for the purpose may take various forms. However, a hinged or swivel connection especially suited for the illustrated box construction draft arm and floating sill, is that shown in which the connection 6 is formed by a pair of castings inserted into and fixed in the confronting ends of each draft arm and the floating sill and, having formed integrally with them, interfitting parts connected for relative horizontal swinging or pivoting by a vertical hinge, draft or pivot pin 45, which or again more precisely, the center or axis of which, is the coupler's horizontal pivot. In the illustrated embodiment, one of the castings, here in the draft arm 4, is a butt casting 46, the integral interfitting part of which is a hinge loop or butt 47 projecting inwardly beyond the draft arm and received in a forwardly opening socket 48 in the other or socket casting 49, here in the adjoining end of the floating sill 8. Having over its central portion a convex cylindrical bearing face or surface 51 on the loop 47, the socket 48 flares forwardly at the sides to accommodate the desired degree of relative angling of the draft arm 4 and floating sill 8. Preferably, the front end of the socket casting or member 49 about the socket 48 is a flat surface 52 coplanar with the end of the floating sill 8, while the rear end of the butt casting about and interrupted centrally by the hinge loop 47 is forwardly inclined or sloped toward either side to provide forwardly diverging flat shoulders 53 which, by virtue of their relative forward inclination, accommodate the relative angling between the draft arm and the floating sill.

Figure 9:
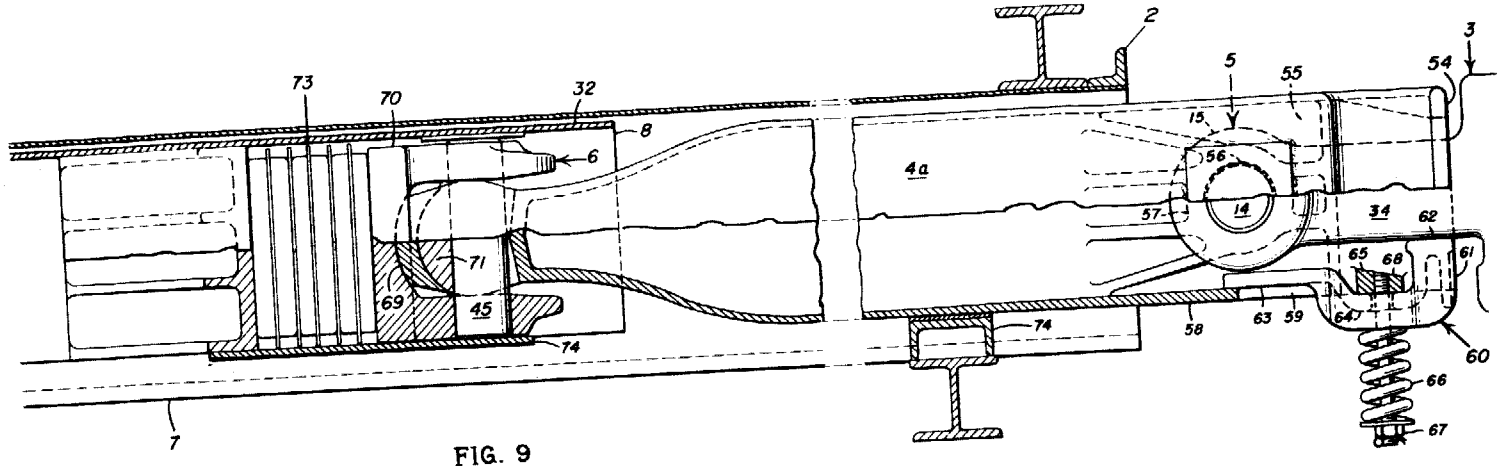
FIGURE 9 is a fragmentary side elevational view of a second embodiment of the draft rigging, with portions broken away and shown in section.
Figure 10:
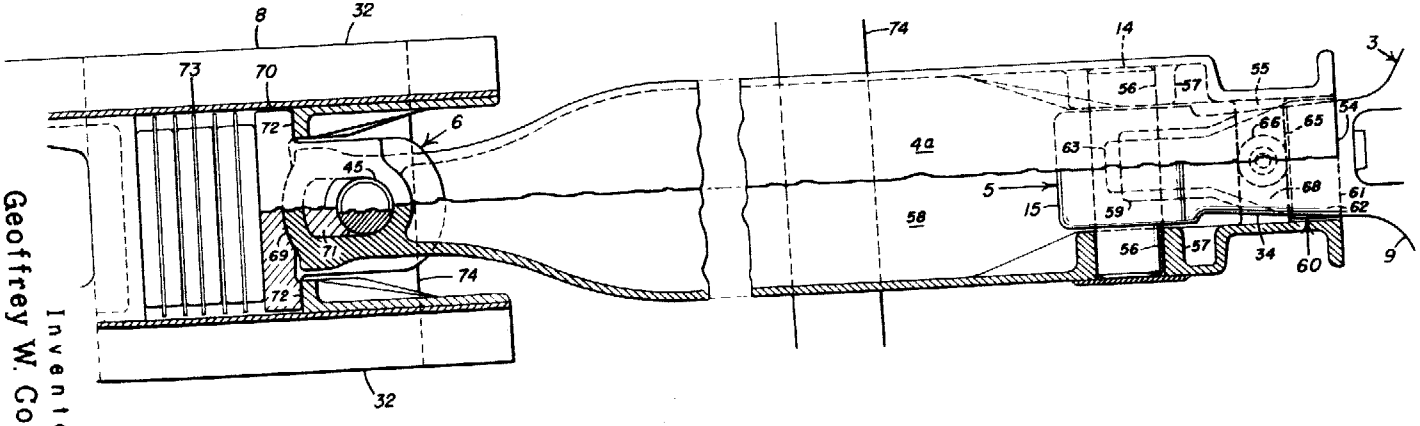
FIGURE 10 is a plan view of the embodiment of FIGURE 9 with portions broken away and shown in section.

While the second embodiment of FIGURES 9 and 10 is basically the same as the first, there are a number of differences between the embodiments besides the provision in the second for the limited rotary movement of the coupler 3 relative to the draft sill 8 in the connection between the sill and the associated draft arm. Designated for convenient reference as 4a, each draft arm of this embodiment, instead of being built up, is conveniently formed as a unitary casting having an integral striker 54 and receiving the butt 15 of the coupler 3 in a forwardly opening recess 55. As it does in the first embodiment, the coupler 3 has an F or interlocking head 9 and a horizontally cylindrical butt 15. However, in this case, the coupler and draft arm 4a are directly connected by the horizontal coupler or pivot pin 14, the latter extending horizontally through the butt and having its ends received in apertures or sockets 56 in rib-reinforced bushings or bearings 57 integral with and instanding from the sides of the draft arm. The coupler 3 may be resiliently supported at coupling height by a suitable resilient coupler carrier, such as that employed in the first embodiment.

However, if, as in this embodiment, the draft arm 4a is a unitary casting, it is preferred to simplify the casting by eliminating the need for a pocket for the carrier iron and springs of the resilient carrier. To this end, the bottom wall 58 of the draft arm 4a is interrupted longitudinally by a slot 59 extending from a point slightly to the rear of the center of the coupler pin 14 or vertical pivot of the coupler 3, forwardly to the front end of the draft arm. In this slot 59 is received a carrier iron 60 of a resilient coupler carrier 61, the carrier iron having a normally raised front part [of] *or* platform 62 for engaging and supporting the shank 34 and, as its rear part, a rearward extension or shelf 63 adapted to be slid under the butt 15 and to rest on the bottom wall 58 at the rear of the slot. The platform 62 and shelf 63 of the carrier iron 60 are connected by an intermediate wall 64 which is downwardly offset to underlie a slot-interrupting transverse or lateral bracket or web 65 integral or rigid with and extending across the bottom of the draft arm 4a intermediate the ends of the slot 59. Limited in vertical movement at the rear by the bottom wall 58 and the butt 15 of the coupler 3, the carrier iron 60 is yieldably or resiliently supported on the bracket 65 by coil springs 66 carried by bolts 67 suspended from the bracket and extending loosely through the intermediate wall 64. Positioned longitudinally of the draft arm by its loose or slotted connection to the bolts 67 for maintaining its overlap with the bottom wall 58, the carrier iron 60 on downward swinging of the coupler 3, will swing substantially parallel thereto by virtue of the position of its shelf 63 relative to the pivotal axis of the coupler and, within the limits of its swinging to the point of engagement of the shank 34 with the forwardly down-sloping upper face 68 of the bracket, will have surface contact with the shank.

The horizontal pivotal connection 6 between the draft arm 4a and the floating sill 8, responsible in this embodiment for both horizontal swinging and limited rotation of the coupler relative to the floating sill, may substantially duplicate the connection in the first embodiment between the coupler 3 and the draft arm 4 with the parts turned through 90° or, even though relative universal movement is unnecessary, may, as illustrated, conform generally to the universal connection of the conventional F coupler to make use of available components and patterns. Thus, as does an F coupler, the illustrated draft arm 4a has a combined spherical center and cylindrical-winged butt 69 universally engaging a follower 70 with the draft pin 45 serving as the horizontal pivot for providing the relative horizontal pivoting and a pin bearing block 71 between *the* pin and the butt permitting relative vertical movement. While the relative vertical movement is of no advantage, the transverse play in the connection between the follower 70 and the floating sill 8 will accommodate the required limited rotative movement of the draft arm 4a and thus the coupler 3 relative to the floating sill. Again, as in the connection of a conventional F coupler, the follower 70 may pull against front draft lugs 72 fixed to the floating sill 8, and, if in the particular underframe it is desired to cushion buffing forces before they are transmitted to the floating sill, the follower may act in buff against a suitable cushioning mechanism 73 pocketed at its rear in the floating sill.

Whether the desired rotation of the coupler 3 relative to the floating and fixed sills 8 and 7 is provided in the connection 5 between the coupler and the draft arm 4, as in the first embodiment, or between the draft arm 4a and the floating sill, as in the second, the draft arm 4 or 4a will be slideably supported forwardly of its pivot for movement relative to the fixed sills 7 on one or more suitably positioned cross-beams or supports 74 extending between and fixed to the fixed sills below the draft arm. If, as in the illustrated embodiments, the improved draft rigging is applied to a cushioned underframe, the floating sill 8 will be connected for yieldable, relative longitudinal movement to the fixed sills 7 by resilient or cushioning means (not shown) suitable to provide the desired travel and cushioning effect, supplemented or not as preferred by a suitable cushioning mechanism 25 or 73 for cushioning buffing forces in their transmittal from the [coupled] *coupler* to the floating sill.

Whether its draft arms 4 or 4a are combined with the floating sill 8 to form an articulated or jointed draft sill extending from end to end of a car and of which the floating sill proper is the main or center part or are mounted only in fixed sills 7, the improved draft rigging is an effective solution for the problems now confronted in designing long cars. This can best be understood by considering its performance under conditions that could not possibly be met with conventional draft rigging. Assume a car to have an overall length of 96 feet, the maximum now contemplated, a spacing between truck centers [at]

*of* 70 feet, again the contemplated maximum, and an overhang at either end of 13 feet from the adjoining truck center or pivot 75 to the pulling face, indicated at 76, of the coupler 3, that the horizontally pivotable draft arm 4 or 4a is approximately 9¼ feet long with its horizontal pivot 45 normally positioned about 2½ feet forwardly or outwardly of the truck center and that the end portions 13 of the fixed sills 7 are spread sufficiently. Under such conditions, the draft arm 4 or 4a is able to angle or swing laterally or horizontally through an arc or angle of 10° to either side of the centerline of the car 2 and provide a maximum lateral offset of the coupler at its pulling face 76 of some 22 inches from the centerline. Such a car, when coupled to a similar car, can negotiate a curve having a sharper radius than any likely to be met in interchange service. Also, the shifting of the responsibility for horizontal pivoting from the coupler to the draft arm and consequent positioning of the horizontal pivot 6 at a point adjacent and in this example normally only about 2½ feet from the adjoining truck center 75, so reduces the moment arm of the pulling force on the coupler that the lateral component of that force cannot cause a derailment even when the car is positioned near the head of a long train, coupled at the front to a short car and at the rear to another long car and being pulled around a curve of the minimum radius negotiable by it. And this freedom from derailment by the lateral component of the pulling force will hold true even if the draft arm 4 or 4a is connected to a floating sill 8 and the latter is at maximum forward displacement under the pulling force.

Since, in the draft rigging of this invention the position of the horizontal pivot 45 is independent of the length of the coupler 3, the overhang at either end of the car 2 is not determinative of the lateral displacement of the coupler and the spacing between the truck centers 75 can be reduced or held within predetermined limits on a car of almost any conceivable length, thus, by use of greater overhangs, permitting cars to be made much longer than any now contemplated without adverse effect upon their curve negotiability. The independence of the horizontal pivot 45 from the length of the coupler 3 also permits the latter to be of conventional length with all the vertical displacement obtainable in a conventional coupler, thereby ensuring that the negotiation of vertical curves will present no problem, regardless of the length of the car. Its coupler needing no extra length, the improved draft rigging also permits the angle cocks 77 for [couping] *coupling* train air lines to be removed from their dangerous positions on the couplers, now customary on long cars, and restored to their conventional positions on the floating or fixed sills, depending on the nature of the underframe. As previously mentioned, the possibility of jackknifing in buff is eliminated simply by providing the couplers 3 with interlocking heads 9, as in the illustrated embodiments, and the first embodiment, by embracing the butt 15 horizontally rather than vertically by the arms 19 of the follower 18, further enables its draft rigging to be accommodated in fixed sills only 10 inches high, with corresponding decrease in the height of the car above the rails.

In addition to solving the problems now confronted in operating a long car as part of a train, the draft rigging of this invention solves a problem which it shares with long couplers and in its case is especially acute because of the length and weight of its draft arm 4 or 4a. This is the problem of centering a coupler for coupling on either curved or straight track without resorting to manual centering, the usual but dangerous practice on long couplers. Alternative solutions have been illustrated, one automatic, the other manually actuated, and each, while shown as applied to the draft arm 4 of the first embodiment, equally adaptable for use with the draft arm 4a of the second.

In the automatic centering mechanism or device 78 illustrated in FIGURES 1–3, 11 and 12 it is recognized that a coupler need be centered for coupling only when it is uncoupled and at that time use is made of the angling of the adjoining truck relative to the centerline of the car, as the truck follows the track, for centering the head 9 of the coupler 3 on the track, while otherwise permitting the coupler to move with the coupler to which it is coupled. In its preferred form, the automatic mechanism 78 includes a joined lever 79, one or a rear or inner arm 80 of which is connected at the rear to and swingable horizontally with the bolster 81 of the adjoining truck (otherwise not shown) and projects forwardly from the bolster substantially normal or at right angles to the latter's centerline radially of the pivot 75 of the truck. The other or front or outer arm 82 of the jointed lever 79 is connected at the rear for relative horizontal swinging to the rear arm 80 by the joint 83 and at the front along the centerline of the car to a cross-brace or strap 84 fixed to and extending between the fixed sills 7 below the draft arm 4. There is a pin-and-slot connection 85 either in the joint 83 or, as illustrated, between the front arm 82 and the cross-bearer 84 to accommodate changes in the length of the lever 79 as it breaks at the joint. The rear arm 80 preferably is provided with an integral side or angle brace 86 to prevent bending and both the brace and the arm preferably are connected to the bolster 81 for vertical swinging relative thereto about a common horizontal axis parallel the bolster's centerline. To relieve the joint or hinge 83 of the weight of the lever 79, the latter preferably is slideably supported adjacent the joint on a cross-bearer or support 87 fixed to and extending across the center sills 7 and here underlying both the rear arm 80 and the floating sill 8.

For transmitting the angling of the rear arm 80 with the bolster 81 and resultant angling of the front arm 82 relative to the centerline of the car, to the draft arm 4, there is provided on the underside of the draft arm a depending, positioning lug 88, itself positioned centrally, laterally or transversely of the draft arm, and fixed thereto, conveniently by forming it integrally with the butt casting 46. In the neutral position of the floating sill 8 in which it is normally held by the resilient means (not shown) connecting it to the fixed sills 7, the positioning or locating lug 88 projects or extends downwardly into a guideway or guide track or slot 89 on or in and extending longitudinally of the top or upper side 90 of the front arm 82 of the jointed lever 79. If, in a particular installation, there is no floating sill to contend with, the guideway 89 may be parallel-sided and of a width to slideably receive or accommodate the positioning lug 88. However, in a floating or cushion underframe installation, such as that illustrated, the guideway 89 preferably is open-ended and its sides 91, while parallel over its central portion in which the lug 88 normally is received, flare or diverge toward either end, thus enabling the lug to move out and be displaced laterally relative to the centerline of the guide way at the extremes of longitudinal movement of the floating sill and still be guided or gathered back into normal position substantially at the longitudinal center of the guideway on return of the sill to neutral position. For the same reason, it is preferred that the positioning lug 88 be substantially diamond-shaped in cross-section and tapered toward either [and] *end*.

The prevent interference by the centering device 78 with lateral movement of the draft arm 4 when its coupler 3 is coupled to another coupler, as well as to accommodate special coupling conditions, such as those encountered on a reverse curve, the front arm 82, instead of being rigid, is itself a jointed member formed of a main part or front arm 92 carrying or mounting the guideway 89 and pivotally connected at the front to the cross-bearer 84 and an equalizer bar or intermediate part or link 93 pivotally connected at the rear to the rear arm 80 and also having a pivotal connection 94 intermediate its ends to the rear end portion of the main part. Thus pivotable horizontally relative to the main part 92, the equalizer bar 93 is yieldably resisted in such movement, suitably by forming on the bar at the front and forwardly of the positioning lug 88, a tongue 95 projecting between bolts 96 extending laterally or transversely through and anchored to opposite sides 97 of the main part and mounting on opposite sides of the tongue a pair of coil or like equalizer springs 98 acting between the sides and the tongue and normally holding the latter centered relative to the main part.

With the automatic centering device 78 constructed in the above manner, any angling of the bolster 81 relative to the centerline of the car 2 will angle or swing both arms 80 and 82 of the jointed lever 79 away from the centerline toward one side of the car and, by the sliding connection between the front arm and the draft arm 4 provided by the guideway 89 and positioning lug 88, cause the draft arm to angle or swing laterally toward the same side of the car. The angle or arc through which the draft arm 4 will swing in response to angling of the bolster 81 is determined or controlled by the lengths of the several moment arms of the leverage acting on the draft arm. Thus, designating the moment arm from the truck or bolster pivot 75 to the joint 83 of the jointed lever 78 as "a," that from the joint 83 to the front pivot of the lever where it is connected by the pin-and-slot connection 85 to the cross-brace 84 as "b," the moment arm from the pivot 45 of the draft arm 4 to the positioning lug 88 as "c" and the remaining arm from the positioning lug to the front pivot of the lever as "d" and disregarding the slight variations in the lengths of the arms "b" and "d" over the range of angling of the lever, if $a/b=c/d$, the angularity of the draft arm at any time relative to the centerline of the car will be the same as that of the bolster. While this equality need not obtain and will not center the head 9 of the coupler 3 under all conditions exactly on the track being negotiated, the centering device 78 does position a coupler head relative to the center of the track rather than relative to the centerline of the car and, by judicious selection of the moment arms, enables the head of an uncoupled coupler to be positioned at all times sufficiently close to the track center [as] to be within the gathering range of the head. With the centering device, there therefore is no problem in automatic coupling raised by the shifting of the horizontal pivot of the coupler 3 rearwardly toward the truck pivot 75.

The alternative centering device 99 shown in FIGURES 13–17, while not automatic, does enable the coupler 3, when uncoupled, to be centered for coupling without exposing an operator to the danger of going between cars and without interfering with the lateral movement required in the coupler when coupled to another. Designed for manual actuation from either side of the car, the manually actuated centering device or mechanism 99 might be adapted to shift or carry the draft arm 4 in one continuous movement along the cross-beam 74 supporting the draft arm at the front to a position in which the coupler head 9 is centered on the track. However, the device 99 is equally effective and much simpler, if, as illustrated, it, on actuation, intermittently engages or lifts the draft arm 4 and incrementally shifts, carries or moves it from initial to centered position. To this end, the illustrated manually actuated device 99 includes a vertically disposed shifter plate or element 100 mounted on and extending longitudinally of the cross-beam 74 below the draft arm 4 and movable relative to the cross-beam in a circular path intermittently to engage and lift the draft arm from the cross-beam and at the same time apply to it a lateral force shifting it toward one or the other side of the car.

Substantially centered laterally of the car, the preferred shifter plate has a straight upper edge 101 of a length to include or embrace the limits of lateral movement of the overlying portion of the draft arm 4 and disposed parallel to the top or upper surface 102 of the cross-beam 74. Conveniently an I-beam, the cross-beam 74 has a slot or recess 103, centrally interrupting its top flange 104 at the front, into which the shifter plate 100 extends and which, with a vertically disposed guide or backing plate 105 fixed to the fronts of and extending between the top and bottom flanges 104 and 106, respectively, of the beam and one or more angle irons 107 mounted on the bottom flange inwardly of the backing plate, serves to guide the shifter plate in its movement relative to the cross-beam. For imparting to it circular or rotary movement in a vertical plane such that it will project intermittently above the cross-beam 74 and engage and act on the draft arm 4, the shifter plate 100 is eccentrically mounted on a pair or plurality of laterally spaced drive shafts or cranks 108 extending normal to and through the plate and, at opposite sides thereof, extending through and journalled in the backing plate 105 and the vertical web 109 of the I-beam.

The shifter plate 100 is supported on the drive shafts 108 on crank arms in the form of eccentric hubs 110 which are journalled in the plate, preferably in antifriction bearings 111. The eccentricity of the hubs 110 relative to the shafts 108 mounting them is such that, as the shafts are rotated, the upper edge 101 of the shifter plate 100 will alternately project above and be retracted into the guide slot 103 in the top flange 104 and, in the interval in which it projects above the flange, will move toward one side or the other of the car, depending on the direction of rotation of the shafts. It therefore is only necessary that the shafts 108 be rotatable together or in unison, both clockwise and counterclockwise, for the shifter plate 100 to act as intended upon the draft arm 4. The desired rotary movement is readily given the drive shafts 108 by a common operating shaft 112 rotatably mounted on and extending longitudinally of the cross-beam 74 beyond opposite sides of the car and carrying or having fixed to it, at each end, a handwheel or other suitable handle 113 and, intermediate its ends, a pair or plurality of bevel gears 114 each meshing with a bevel gear 115 fixed to the inner end of one of the drive shafts. Accordingly, an operator can stand at either side of the car and by turning the adjoining handwheel 113 in one direction or the other, shift or move the draft arm 4 toward one or the other side of the car 2 as necessary to center the coupler head 9 on the track.

From the above [-] detailed description it will be apparent that there has been provided an improved draft rigging which in its various features solves the problems heretofore confronted in adapting long cars for negotiating and being coupled on curves of the range of radii encountered in interchange service. It should be understood that the described and disclosed embodiments are merely exemplary of the invention and that all modifications are intended to be included that do not depart from the spirit of the invention [or] *and* the scope of the appended claims.

Having described my invention, I claim:

[1. Draft rigging for a railway car comprising sill means extending longitudinally of said car, a coupler, and a draft arm aligned horizontally with said sill means and carrying said coupler, said draft arm being connected forwardly to said coupler for relative vertical swinging and rearwardly to said sill means for horizontal swinging relative thereto in unison with said coupler.]

2. Draft rigging for a *long overhang* railway *freight* car comprising sill means extending longitudinally of said car and movable longitudinally relative thereto, a coupler, [and] a draft arm aligned horizontally with said sill means and carrying said coupler, said draft arm being connected forwardly to said coupler for relative vertical swinging and rearwardly to said sill means for horizontal swinging relative thereto in unison with said coupler, *and means operative with said coupler uncoupled and acting through said draft arm for centering a head of said cou-*

*pler for coupling on both curved and straight underlying track.*

3. Draft rigging for a *long overhang* railway *freight* car comprising sill means extending longitudinally of said car, a coupler, a draft arm aligned horizontally with said sill means and carrying said coupler, said draft arm being *pivotally* connected forwardly to said coupler for relative vertical swinging and rearwardly to said sill means for horizontal swinging relative thereto in unison with said coupler, and means operative with said coupler uncoupled and acting through said draft arm for centering a head of said coupler for coupling on *both curved and straight* underlying track.

4. Draft rigging for a *long overhang* railway *freight* car comprising sill means extending longitudinally of said car, a coupler, a draft arm aligned horizontally with said sill means and carrying said coupler, said draft arm being *pivotally* connected forwardly to said coupler for relative vertical swinging and rearwardly to said sill means for horizontal swinging relative thereto in unison with said coupler, and means responsive to angling of an adjoining truck relative to said car and acting through said draft arm in the uncoupled condition of said coupler for automatically centering a head of said coupler for coupling on *both curved and straight* underlying track.

5. Draft rigging for a *long overhang* railway *freight* car comprising sill means extending longitudinally of said car, a coupler, a draft arm aligned horizontally with said sill means and carrying said coupler, said draft arm being *pivotally* connected forwardly to said coupler for relative vertical swinging and rearwardly to said sill means for horizontal swinging relative thereto in unison with said coupler, and means actuatable from a side of said car and acting through said draft arm in the uncoupled condition of said coupler for centering a head of said coupler for coupling on *both curved and straight* underlying track.

6. Draft rigging for a *long overhang* railway *freight* car comprising sill means extending longitudinally of said car, a coupler, a draft arm carrying said coupler, said draft arm being *pivotally* connected forwardly to said coupler for relative vertical swinging and rearwardly to said sill means for horizontal swinging relative thereto in unison with said coupler, and means actuatable from a side of said car and on actuation with said coupler uncoupled acting intermittently on and incrementally shifting said draft arm laterally of said car for centering a head of said coupler for coupling on *both curved and straight* underlying track.

7. Draft rigging for a railway car comprising sill means extending longitudinally of said car, a coupler, a draft arm carrying said coupler, said draft arm being connected forwardly to said coupler for relative vertical swinging and rearwardly to said sill means for horizontal swinging relative thereto in unison with said coupler, fixed means underlying and supporting said draft arm forwardly of the connection thereof to said sill means, means eccentrically mounted on and projectable in a circular path above said fixed means for engaging and incrementally shifting said draft arm laterally toward either side of said car in the uncoupled condition of said coupler and thereby centering a head of said coupler for coupling on underlying track, and means actuatable from a side of said car for operating said shifting means.

8. Draft rigging for a railway car comprising sill means extending longitudinally of said car, a coupler, a draft arm carrying said coupler, said draft arm being connected forwardly to said coupler for relative vertical swinging and rearwardly to said sill means for horizontal swinging relative thereto in unison with said coupler, a cross-beam fixed to said car and underlying and supporting said draft arm forwardly of the connection thereof to said sill means, a shifter plate substantially centered laterally of said car and underlying and having an upper edge of a length to engage an adjoining part of said draft arm over the range of horizontal swinging thereof relative to said car, eccentric drive means mounting said shifter plate on said cross-beam for movement in a circular path whereover said upper edge remains substantially parallel to and projects above and below an upper surface of said cross-beam supporting said draft arm for incrementally shifting said draft arm laterally toward either side of said car in the uncoupled condition of said coupler and thereby centering a head of said coupler on underlying track, and operating means actuatable from either side of said car for driving said drive means.

9. Draft rigging for a *long overhang* railway *freight* car comprising sill means extending longitudinally of said car, a coupler, a draft arm aligned horizontally with said sill means and carrying said coupler, said draft arm being *pivotally* connected forwardly to said coupler for relative vertical swinging and rearwardly to said sill means for horizontal swinging relative thereto in unison with said coupler, [and] means in the connection of said draft arm to one of said sill means and coupler for permitting limited rotation of said coupler relative to said sill means, *and means operative with said coupler uncoupled and acting through said draft arm for centering a head of said coupler for coupling on both curved and straight underlying track.*

10. Draft rigging for a *long overhang* railway *freight* car comprising center sills fixed to and extending longitudinally of said car, a draft arm in and projecting forwardly beyond said sills in horizontal alignment therewith and *pivotally* connected at the rear thereof for relative horizontal swinging, said sills from a point adjacent said connection having sides thereof forwardly flared to accommodate said relative horizontal swinging, [and] a coupler carried at the front by and *pivotally* connected for relative vertical swinging to said draft arm, *and means operative with said coupler uncoupled and acting through said draft arm for centering a head of said coupler for coupling on both curved and straight underlying track.*

11. Draft rigging for a *long overhang* railway *freight* car comprising center sills fixed to and extending longitudinally of said car, a draft arm in and projecting forwardly beyond said sills *and* aligned horizontally [with said sill means] *therewith* and *pivotally* connected at the rear thereto for relative horizontal swinging, said sills from a point adjacent said connection having sides thereof forwardly flared to accommodate said relative horizontal swinging, a coupler carried at the front by and *pivotally* connected for relative vertical swinging to said draft arm, [and] means acting between said draft arm and one of said center sills and coupler for cushioning longitudinal forces transmitted between said sills and coupler, *and means operative with said coupler uncoupled and acting through said draft arm for centering a head of said coupler for coupling on both curved and straight underlying track.*

12. Draft rigging for a *long overhang* railway *freight* car comprising center sills fixed to and extending longitudinally of said car, a draft arm in and projecting forwardly beyond said sills in horizontal alignment therewith and *pivotally* connected at the rear thereto for relative horizontal swinging, said sills from a point adjacent said connection having sides thereof forwardly flared to accommodate said relative horizontal swinging, a coupler carried at the front by and *pivotally* connected for relative vertical swinging to said draft arm, means acting between said draft arm and one of said center sills and coupler for cushioning longitudinal forces transmitted between said sills and coupler, [and] means in the connection of said draft arm to one of said center sills and coupler for permitting limited rotation of said coupler relative to said sills, *and means operative with said coupler uncoupled and acting through said draft arm for centering a head of said coupler for coupling on both curved and straight underlying track.*

13. Draft rigging for a *long overhang* railway *freight* car comprising a draft sill extending from end to end of and movable against yieldable resistance longitudinally relative to said car, said sill including a center part and a pair of draft arms horizontally aligned with and *pivotally* connected for relative horizontal swinging to opposite ends of said center part, a coupler carried by [and] *each draft arm forwardly of said center part, each coupler* projecting forwardly from [each of said] *the related* draft [arms] *arm* and *being pivotally* connected thereto *rearwardly of a front end thereof* for relative vertical swinging, means mounted on each of said draft arms *rearwardly of said front end thereof and* forwardly of the connection thereof to the related coupler for *engaging and* resiliently supporting a shank of said coupler, and a head on each of said couplers interlockable against relative jackknifing to a head of another coupler.

14. Draft rigging for a *long overhang* railway *freight* car comprising a draft sill extending from end to end of and movable against yieldable resistance longitudinally relative to said car, said sill including a center part and a pair of draft arms horizontally aligned with and *pivotally* connected for relative horizontal swinging to opposite ends of said center part, a coupler carried by [and] *each draft arm forwardly of said center part, each coupler* projecting forwardly from [each of said] *the related* draft [arms] *arm* and *being pivotally connected thereto* connected thereto *rearwardly of a front end thereof* for relative vertical swinging, means mounted on each of said draft arms *rearwardly of said front end thereof and* forwardly of the connection thereof to the related coupler for *engaging and* resiliently supporting a shank of said coupler, a head on each of said couplers interlockable against relative jackknifing to a head of another coupler, and means acting between each draft arm and one of said center part and related coupler for cushioning longitudinal forces transmitted between said part and coupler.

15. Draft rigging for a *long overhang* railway *freight* car comprising a draft sill extending from end to end of and movable against yieldable resistance longitudinally relative to said car, said sill including a center part and a pair of draft arms horizontally aligned with and *pivotally* connected for relative horizontal swinging to opposite ends of said center part, a coupler carried by [and] *each draft arm forwardly of said center part, each coupler* projecting forwardly from [each of said] *the related* draft [arms] *arm* and *being pivotally* connected thereto *rearwardly of a front end thereof* for relative vertical swinging, means mounted on each of said draft arms forwardly of the connection thereof to the related coupler for *engaging and* resiliently supporting a shank of said coupler, a head on each of said couplers interlockable against relative jackknifing to a head of another coupler, means acting between each draft arm and one of said center part and related coupler for cushioning longitudinal forces transmitted between said part and coupler, and means in the connection between each draft arm and one of said center part and related coupler for permitting limited rotation of said coupler relative to said part.

16. Draft rigging for a *long overhang* railway *freight* car comprising a draft sill extending from end to end of and movable against yieldable resistance longitudinally relative to said car, said sill including a center part and a pair of draft arms horizontally aligned with and *pivotally* connected for relative horizontal swinging to opposite ends of said center part, a coupler carried by and projecting forwardly from each of said draft arms and *pivotally* connected thereto for relative vertical swinging, means mounted on each of said draft arms forwardly of the connection thereof to the related coupler for *engaging and* resiliently supporting a shank of said coupler, a head on each of said couplers interlockable against relative jackknifing to a head of another coupler, means acting between each draft arm and one of [siad] *said* center part and related coupler for cushioning longitudinal forces transmitted between said part and coupler, means in the connection between each draft arm and one of said center part and related coupler for permitting limited rotation of said coupler relative to said part, and means operative in the uncoupled condition of each coupler and acting through the related draft arm for centering said head of said coupler for coupling on *both curved and straight* underlying track.

17. Draft rigging for a *long overhang* railway *freight* car comprising a draft sill extending from end to end of and movable against yieldable resistance longitudinally relative to said car, said sill including a center part and a pair of draft arms *pivotally* connected for relative horizontal swinging to opposite ends of said center part, a coupler carried by and projecting forwardly from each of said draft arms and *pivotally* connected thereto for relative vertical swinging, means mounted on each of said draft arms forwardly of the connection thereof to the related coupler for *engaging and* resiliently supporting a shank of said coupler, a head on each of said couplers interlockable against relative jackknifing to a head of another coupler, means acting between each draft arm and one of said center part and related coupler for cushioning longitudinal forces transmitted between said part and coupler, means in the connection between each draft arm and one of said center part and related coupler for permitting limited rotation of said coupler relative to said part, and means operable in the uncoupled condition of each coupler and acting on the related draft arm in response to angling of an adjoining truck in either direction relative to said car for effecting a predetermined angling of said draft arm in the same direction and thereby automatically centering said head of said coupler for coupling on *both curved and straight* underlying track.

18. Draft rigging for a *long overhang* railway *freight* car comprising fixed center sills extending substantially the length of said car, a draft sill mounted in and projecting beyond opposite ends of said center sills in horizontal alignment therewith and movable against yieldable resistance longitudinally relative thereto, said draft sill including a center part extending at opposite ends in the neutral condition thereof beyond pivots of trucks of said car and *a* pair of draft arms *pivotally* connected for relative horizontal swinging to opposite ends of said center part, said center sills from a point adjacent the innermost position of the connection of each draft arm to said center part having sides forwardly flared to accommodate said relative angling, a coupler carried by and projecting forwardly from each of said draft arms and *pivotally* connected thereto for relative vertical swinging, means mounted on each of said draft arms forwardly of the connection thereof to the related coupler for *engaging and* resiliently supporting a shank of said coupler, a head on each of said couplers interlockable against relative jackknifing to a head of another coupler, [and] means acting between each draft arm and one of said center part and related coupler for cushioning longitudinal forces transmitted between said part and coupler, *and means operable in the uncoupled condition of each coupler and acting on the related draft arm in response to angling of an adjoining truck in either direction relative to said car for effecting a predetermined angling of said draft arm in the same direction and thereby automatically centering said head of said coupler for coupling on both curved and straight underlying track.*

*19. Draft rigging for a long overhang railway freight car comprising a coupler, a draft arm carrying said coupler, said draft arm extending rearwardly beyond said coupler and being connected rearwardly thereof for relative horizontal swinging to said car, said draft arm rearwardly of a front end thereof and forwardly of the pivotal connection thereof to said car being pivotally connected for relative vertical swinging to said coupler, and*

*means mounted in said draft arm between said front end thereof and the connection thereof to said coupler and engaging and acting on a shank of said coupler for resiliently supporting said coupler.*

*20. Draft rigging according to claim 19 wherein the draft arm is slidably supported forwardly of the connection thereof to the car on means fixed to the car.*

*21. Draft rigging according to claim 19 wherein the means resiliently supporting the coupler are removably mounted in the draft arm and include coil spring means.*

*22. Draft rigging according to claim 21 wherein the coupler shank projects rearwardly into and the supporting means is mounted in a front portion of the draft arm.*

*23. In draft rigging for a long overhang railway freight car having a coupler at an end thereof, the combination of a draft arm for carrying said coupler, said draft arm extending rearwardly beyond said coupler and being connectable rearwardly thereof for relative horizontal swinging to said car, said draft arm rearwardly of a front end thereof and forwardly of the pivotal connection thereof to said car being pivotally connected for relative vertical swinging to said coupler, and means mounted in said draft arm between said front end thereof and the connection thereof to said coupler and engageable with and actable on a shank of said coupler for resiliently*

*supporting said coupler on connection of said draft arm to said car and coupler.*

References Cited by the Examiner

The following references, cited by the Examiner, are of record in the patented file of this patent or the original patent.

UNITED STATES PATENTS

| | | | |
|---|---|---|---|
| 1,072,041 | 9/1913 | Schmidt | 213—15 |
| 1,178,931 | 4/1916 | Krakau | 213—15 |
| 1,267,053 | 5/1918 | Campbell | 213—15 |
| 1,404,878 | 1/1922 | Milliken | 213—63 |
| 1,426,221 | 8/1922 | Sandman | 213—63 |
| 1,524,679 | 3/1925 | Van Dorn | 213—14 |
| 1,914,469 | 6/1933 | Van Dorn | 213—12 |
| 1,947,316 | 2/1934 | Suckow | 213—8 |
| 1,955,838 | 4/1934 | Shafer | 213—8 |
| 2,071,491 | 2/1937 | Bazeley | 213—17 |
| 2,149,840 | 3/1939 | Christianson | 213—20 |
| 2,645,362 | 7/1953 | Spence | 213—62 |
| 2,850,180 | 9/1958 | Kayler et al. | 213—72 |
| 2,869,736 | 1/1959 | Wolfe | 213—72 |

ARTHUR L. LA POINT, *Primary Examiner.*

D. E. HOFFMAN, *Assistant Examiner.*